US008825532B1

(12) United States Patent
Wong

(10) Patent No.: US 8,825,532 B1
(45) Date of Patent: Sep. 2, 2014

(54) PAYMENT SYSTEM AND METHOD USING A MOBILE TELEPHONE NETWORK FOR CHARGING AND SETTLEMENT

(71) Applicant: Kamfu Wong, Hong Kong (CN)

(72) Inventor: Kamfu Wong, Hong Kong (CN)

( * ) Notice: Subject to any disclaimer, the term of this patent is extended or adjusted under 35 U.S.C. 154(b) by 0 days.

(21) Appl. No.: 13/773,365

(22) Filed: Feb. 21, 2013

(51) Int. Cl.
*G06Q 20/32* (2012.01)

(52) U.S. Cl.
USPC ............... 705/21; 705/39; 705/41; 705/44; 705/16; 705/67; 235/379; 235/380; 235/382; 235/381

(58) Field of Classification Search
USPC ............... 705/21, 39, 14.17, 35; 379/145; 235/380, 378
See application file for complete search history.

(56) References Cited

U.S. PATENT DOCUMENTS

| | | | | |
|---|---|---|---|---|
| 6,598,028 | B1 * | 7/2003 | Sullivan et al. | 705/36 R |
| 7,540,408 | B2 * | 6/2009 | Levine et al. | 235/379 |
| 7,603,312 | B2 * | 10/2009 | McElroy et al. | 705/39 |
| 8,281,991 | B2 * | 10/2012 | Wentker et al. | 235/382 |
| 2001/0056398 | A1 * | 12/2001 | Scheirer | 705/38 |
| 2002/0097715 | A1 * | 7/2002 | Roerick | 370/389 |
| 2002/0120537 | A1 * | 8/2002 | Morea et al. | 705/35 |
| 2003/0060246 | A1 * | 3/2003 | Bueermann et al. | 460/112 |
| 2007/0295803 | A1 * | 12/2007 | Levine et al. | 235/379 |
| 2010/0030634 | A1 * | 2/2010 | McElroy et al. | 705/14.17 |
| 2010/0161478 | A1 * | 6/2010 | Cavanaugh et al. | 705/39 |

* cited by examiner

*Primary Examiner* — Vanel Frenel
(74) *Attorney, Agent, or Firm* — Winstead PC

(57) ABSTRACT

A payment system and method using a mobile telephone network for charging and settlement, which comprises a user's cell phone being associated with a payment account, and the user's cell phone accessing the international payment and settlement center. The international payment and settlement center generates a payment code according to the amount of payment, which is transmitted to the user's cell phone. The user uses said payment code to pay the merchant's POS machine. The POS machine reads said payment code and requests authorization for the transaction from the international payment and settlement center. The international payment and settlement center authorizes said transaction after verifying the correctness. During settlement, the international payment and settlement center collects the money of said transaction from the payment account of the user, and pays the money that should be charged by the merchant in this transaction to the receipts account of the merchant.

12 Claims, 2 Drawing Sheets

PAYMENT SYSTEM AND METHOD USING A MOBILE TELEPHONE NETWORK FOR CHARGING AND SETTLEMENT

TECHNICAL FIELD

The present invention relates to a financial payment technique, in particular to a payment system and method using a mobile telephone network for charging and settlement.

BACKGROUND OF THE INVENTION

With the population of cell phones, they have become the communication tools commonly used by people, and most people not only have cell phones, but they carry them around. A mobile telephone network will have all cell phones accessing it to go through a very strict authentication formality, so the identity of a cell phone in the mobile telephone network is hard to fake and is very reliable, and it is safer and more reliable than bank cards that are usually used by people for payment. The present invention takes advantage of said particular feature of the mobile telephone network and replaces bank cards with the mobile telephone network to authenticate the user's identity during payment.

SUMMARY OF THE INVENTION

The object of the present invention is to provide a payment system and method using a mobile telephone network for charging and settlement, such that various applications of cell phone payment can be realized.

The object of the present invention is achieved in such a way as follows: a payment system using a mobile telephone network for charging and settlement is adopted, which is characterized in that said payment system comprises an international payment and settlement center (1), a mobile telephone network (2), a merchant's POS machine (3), a user's cell phone (4), wherein the international payment and settlement center (1) is in communication connection to the mobile telephone network (2), and the international payment and settlement center (1) includes the payment account of each user and the receipts account of each merchant, the user's cell phone (4) includes an SIM card which is associated with the user's payment account, and the user's cell phone (4) accesses the mobile telephone network (2) after the mobile telephone network (2) authenticating the SIM card of the cell phone (4), the merchant's POS machine (3) includes an SIM card which is associated with the receipts account of the merchant, the merchant's POS machine (3) accesses the mobile telephone network (2) after the mobile telephone network (2) authenticating the SIM card of the POS machine (3); when the user makes a payment on the merchant's POS machine (3), the international payment and settlement center (1) generates an one-off payment code according to the amount of payment, which is transmitted to the user's cell phone (4) over the mobile telephone network (2), and the user's cell phone (4) transmits said payment code to the merchant's POS machine (3), then the POS machine (3) sends a transaction message including the amount of payment and said payment code to the international payment and settlement center (1) over the mobile telephone network (2) to request authorization to said transaction, and the international payment and settlement center (1) authorizes said transaction after checking the correctness of said payment code and amount of payment, and then returns the result of authorization to the POS machine (3), and the international payment and settlement center (1), after authorizing said transaction, collects the money of said transaction from the payment account of the user, and pays the money that should be charged by the merchant to the receipts account of the merchant after deducting the commission and handling charges.

A payment method using a mobile telephone network for charging and settlement is also adopted, which is characterized in that said method comprises providing an international payment and settlement center (1) that includes the payment account of each user and the receipts account of each merchant, the user's cell phone (4) includes an SIM card which is associated with the user's payment account, and the user's cell phone (4) accesses the mobile telephone network (2) after the mobile telephone network (2) authenticating the SIM card of the cell phone (4), the merchant's POS machine (3) includes an SIM card which is associated with the receipts account of the merchant, the merchant's POS machine (3) accesses the mobile telephone network (2) after the mobile telephone network (2) authenticating the SIM card of the POS machine (3); when the user makes a payment on the merchant's POS machine (3), the international payment and settlement center (1) generates an one-off payment code according to the amount of payment, which is transmitted to the user's cell phone (4) over the mobile telephone network (2), and the user's cell phone (4) transmits said payment code to the merchant's POS machine (3), then the POS machine (3) sends a transaction message including the amount of payment and said payment code to the international payment and settlement center (1) over the mobile telephone network (2) to request authorization to said transaction, and the international payment and settlement center (1) authorizes said transaction after checking the correctness of said payment code and amount of payment, and then returns the result of authorization to the POS machine (3), and the international payment and settlement center (1), after authorizing said transaction, collects the money of said transaction from the payment account of the user, and pays the money that should be charged by the merchant to the receipts account of the merchant after deducting the commission and handling fees.

Thus the object of the present invention is well achieved.

The payment system and method using a mobile telephone network for charging and settlement of the present invention is safer and more reliable compared to payment by using credit cards, and users can pay the merchants by using only cell phones (4). Moreover, authentication of the cell phone (4) through the mobile telephone network (2) can ensure authenticity of the identity, so even if any thief has duplicated the SIM card of a user by various means, as long as the user's cell phone (4) is always power on, when the thief tries to access the mobile telephone network (2) by a cell phone with the duplicated SIM card, the mobile telephone network (2) will immediately discover that two cell phones of the same identity have accessed the network and will instantly put said SIM card into a blacklist, such that neither the user nor the thief can continue using the cell phone with said SIM card identity, thus preventing the thief from making payments by faking the user's identity.

BRIEF DESCRIPTION OF THE DRAWINGS

In the figures, the same numerals represent the same devices and components, and method steps are indicated by numerals in circles and lines with arrows. The figures are schematic for illustrating the construction of the system and the main steps of the method of the present invention.

DETAILED DESCRIPTION OF THE INVENTION

The method of the present invention will be described in further detail below with reference to the drawings.

Figure 1:
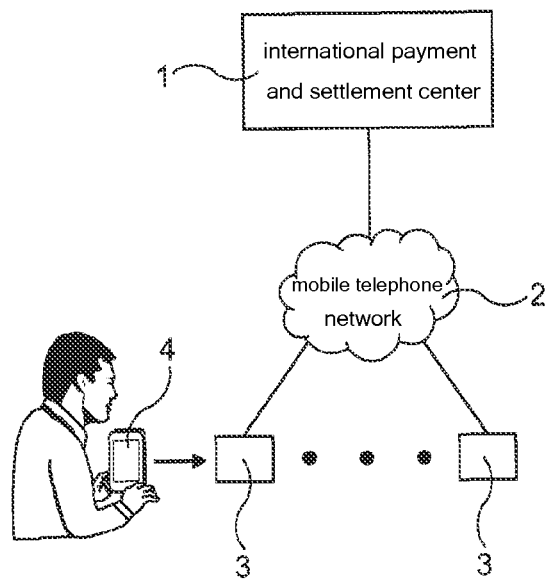
FIG. 1 is a schematic drawing of the structure of a payment system according to the first embodiment of the present invention.

Referring to FIG. 1, which is a schematic drawing of the structure of a payment system according to the first embodiment of the present invention. The payment system shown in FIG. 1 comprises an international payment and settlement center (1), a mobile telephone network (2), a merchant's POS machine (3), and a user's cell phone (4), wherein the international payment and settlement center (1) is in communication connection to the mobile telephone network (2), and the international payment and settlement center (1) includes the payment account of each user and the receipts account of each merchant, the user's cell phone (4) includes an SIM card which is associated with the user's payment account, that is, the telephone number represented by said SIM card is bound to the payment account of the user, and the money paid by the user through the cell phone (4) will be recorded in this payment account, and the user's cell phone (4) accesses the mobile telephone network (2) after the mobile telephone network (2) authenticating the SIM card of the cell phone (4), the merchant's POS machine (3) includes an SIM card which is associated with the receipts account of the merchant, that is, the telephone number represented by said SIM card is bound to the receipts account of the merchant, and the money collected by the merchant using the POS machine (3) will be recorded in this receipts account, the merchant's POS machine (3) accesses the mobile telephone network (2) after the mobile telephone network (2) authenticating the SIM card of the POS machine (3); when the user makes a payment on the merchant's POS machine (3), the international payment and settlement center (1) generates an one-off payment code according to the amount of payment, which is transmitted to the user's cell phone (4) over the mobile telephone network (2), said payment code being equivalent to a credit card which can be used for payment at the merchant, and the user's cell phone (4) transmits said payment code to the merchant's POS machine (3), then the POS machine (3) sends a transaction message including the amount of payment and said payment code to the international payment and settlement center (1) over the mobile telephone network (2) to request authorization to said transaction, and the international payment and settlement center (1) authorizes said transaction after checking the correctness of said payment code and amount of payment, and then returns the result of authorization to the POS machine (3), and the international payment and settlement center (1), after authorizing said transaction, collects the money of said transaction from the payment account of the user, and pays the money that should be charged by the merchant to the receipts account of the merchant after deducting the commission and handling charges. When settling the accounts, the international payment and settlement center (1) collects the money from the user's bank account according to a transaction record of the payment account of the user and pays the money that should be collected by the merchant into the bank account of the merchant according to a transaction record of the receipts account of the merchant.

In this description, the cell phone (4) is a mobile terminal that uses a SIM card to authenticate the identity and to access the mobile telephone network, which includes such electronic devices as mobile phones or intelligent phones of various standards, the SIM card is a smart card for authenticating the identity of the user's cell phone, such as a SIM card for use in a GSM mobile telephone network, a USIM card for use in a 3G network, or a UIM card for use in a CDMA network. The mobile telephone network (2) can be mobile telephone networks of various standards including GSM, 3G, 4G, CDMA, TD-SCDMA, LTE and so on. In addition, the user's bank account may be a credit card account, a debit card account, a savings account, a check account, etc.

In terms of the setting, the international payment and settlement center (1) needs to be set in the settling place, and the ideal settling place is Hong Kong, because it allows free flow of capital from all over the world. The international payment and settlement center (1) is connected respectively to an original charging system of the mobile telephone network (2) and each of the banks, and it needs to bind the mobile phone account of each of the users of the mobile telephone network (2) to the payment account of said user, and the user may also register his bank account into the international payment and settlement center (1) and authorize the international payment and settlement center (1) to transfer money from his bank account to his payment account. In terms of the merchant, the merchant needs to open a receipts account at the international payment and settlement center (1) and sets a POS machine (3) which may be a mobile POS machine including a cell phone module, the POS machine (3) may access the mobile telephone network (2) to realize data communication with the international payment and settlement center (1) and to transmit information relating to payment made by the user during transaction at the merchant to the international payment and settlement center (1) to be processed, and the merchant may also register its bank account into the international payment and settlement center (1), so that the international payment and settlement center (1) can transfer money in the receipts account of said merchant into the bank account of said merchant at the time of settlement every day. The POS machine (3) herein is similar to the common POS machines that can accept credit card payment, and the only difference is that common POS machines obtain such information as the credit card number by swiping the card and transfer information relating to payment to the acquiring bank, while the POS machine (3) herein can read the payment code from the cell phone (4) and transmit information relating to payment to the international payment and settlement center (1). In addition, by modifying the software of some existing POS machines to add a function of reading payment codes from a cell phone (4), said existing POS machines can be used to realize the functions of the POS machine (3) of the present invention. In terms of the user, the user needs to set a password for his payment account, and before making a payment, the user needs to use his cell phone (4) to send the transaction request message including user password and upper limit of amount of payment to the international payment and settlement center over the mobile telephone network (2), then the international payment and settlement center (1) generates an one-off unique payment code according to the amount of payment after verifying the correctness of the password and the upper limit of amount of payment and returns it to the user's cell phone (4), so that the user can make a payment that does not exceed said amount of payment on the POS machine (3) using said payment code.

In this description, the communication between the user's cell phone (4) and the international payment and settlement center (1) can be realized by means of USSD (Unstructured Supplementary Service Data) message. The mobile telephone network (2) pre-sets a USSD access code for use by the user for payment, and the user can initiate a communication between the cell phone (4) and the international payment and settlement center (1) through said USSD access code using the cell phone (4). For example, the USSD access code is 1888, the format of the transaction request message is *1888*password*upper limit of amount of payment#, before making the payment, the user needs to use the cell phone (4) to send a transaction request message to the international payment and settlement center (1) over the mobile telephone network (2), for example, the password is 999888, the upper limit of amount of payment is $500, then the user can send the transaction request message to the international payment and settlement center (1) simply by dialing *1888*999888*500# on the cell phone (4), then the international payment and settlement center (1) generates an one-off unique payment code according to the amount of payment after verifying the source telephone number of the USSD message, the password, the upper limit of amount of payment, and returns it to the user's cell phone (4), thus the user can use this payment code to make a payment on the POS machine (3).

In addition to using the USSD message to realize communication between the cell phone (4) and the international payment and settlement center (1), instant data messaging can also be used to realize communication between the cell phone (4) and the international payment and settlement center (1). By means of such a way of communication, a payment program for processing payment needs to be installed in the user's cell phone (4) and an instant messaging server needs to be provided at the international payment and settlement center (1), and the cell phone (4) performs instant messaging with the instant messaging server of the international payment and settlement center (1) through said payment program. Said payment program needs to be bound to the cell phone (4), namely, after the cell phone (4) accessing the mobile telephone network (2) by authenticating the SIM card thereof, the payment application enables a communication with the international payment and settlement center (1) by means of the identity of the cell phone (4) in mobile telephone network (2), and thus the identity authentication mechanism of the mobile telephone network is used as the identity of the payer. Before performing the payment, the user needs to access the instant messaging server of the international payment and settlement center (1) by means of the payment program of the cell phone (4) so as to send a transaction request message including such information as the password and the upper limit of the amount of payment to the international payment and settlement center (1), then the international payment and settlement center (1) generates an one-off unique payment code according to the amount of payment after verifying the correctness of the password and the upper limit of amount of payment and returns it to the user's cell phone (4), so that the user can make a payment that does not exceed said amount of payment on the POS machine (3) using said payment code by means of the payment program.

Figure 2:
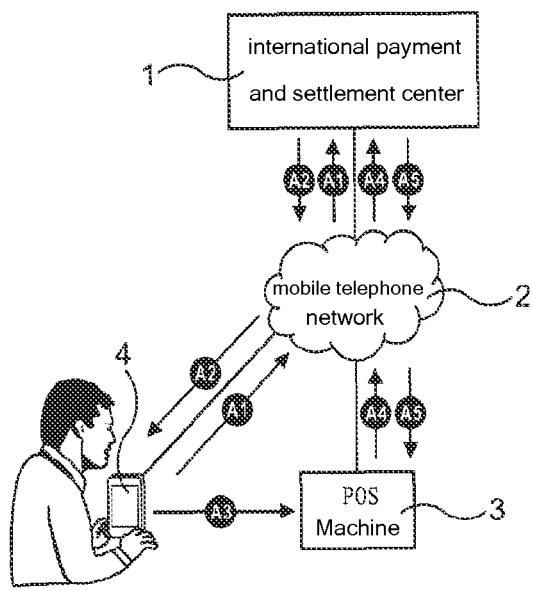
FIG. 2 is a schematic drawing of the steps of a payment system according to the first embodiment of the present invention.

Referring to FIG. 2, which is a schematic drawing of the steps of a payment system according to the first embodiment of the present invention. Said method shown in FIG. 2 comprises providing an international payment and settlement center (1) that includes the payment account of each user and the receipts account of each merchant, the user's cell phone (4) includes an SIM card which is associated with the user's payment account, and the user's cell phone (4) accesses the mobile telephone network (2) after the mobile telephone network (2) authenticating the SIM card of the cell phone (4), the merchant's POS machine (3) includes an SIM card which is associated with the receipts account of the merchant, the merchant's POS machine (3) accesses the mobile telephone network (2) after the mobile telephone network (2) authenticating the SIM card of the POS machine (3); when the user makes a payment on the merchant's POS machine (3), the international payment and settlement center (1) generates an one-off payment code according to the amount of payment, which is transmitted to the user's cell phone (4) over the mobile telephone network (2), said payment code is equivalent to a credit card, which can be used for payment at the merchant, and the user's cell phone (4) transmits said payment code to the merchant's POS machine (3), then the POS machine (3) transmits transaction message including the amount of payment and said payment code to the international payment and settlement center (1) over the mobile telephone network (2) to request authorization to said transaction, and the international payment and settlement center (1) authorizes said transaction after verifying the correctness of said payment code and amount of payment, and then returns the result of authorization to the POS machine (3), and the international payment and settlement center (1), after authorizing said transaction, collects the money of said transaction from the payment account of the user, and pays the money that should be charged by the merchant to the receipts account of the merchant after deducting the commission and handling fees.

Referring still to FIG. 2, in which the method further comprises the following group of steps A, which are steps of the user making a payment on the POS machine (3) of the merchant using the cell phone (4), specifically, said group of steps A includes:

A1: before making a payment, the user sending a transaction request message to the international payment and settlement center (1) over the mobile telephone network (2) using the cell phone (4), said transaction request message including the upper limit of the amount of payment and the password;

A2: the international payment and settlement center (1) generating an one-off unique payment code according to the amount of payment after verifying the correctness of the transaction request message and returning it to the user's cell phone (4);

A3: the user's cell phone (4) transmitting the said payment code to the merchant's POS machine (3);

A4: the POS machine (3) generating a transaction message according to the payment code and the amount of payment, and transmitting said transaction message to the international payment and settlement center (1) over the mobile telephone network (2);

A5: the international payment and settlement center (1) authorizing said transaction after verifying the correctness of the payment code and the amount of payment included in the transaction message, and then returning the result of authorization to the POS machine (3);

the international payment and settlement center (1) collecting the money for said transaction from the payment account of the user after authorizing said transaction and paying the money that should be charged by the merchant in said transaction to the receipts account of the merchant after deducting the commission and handling charges.

In the present invention, different methods can be used to transmit the payment code received by the cell phone (4) to the POS machine (3), for example, the merchant may manually enter the payment code displayed on the screen of the cell phone (4) into the POS machine (3), or a bar code may be adopted, or an NFC (Near Field Communication) technique may be used, and all these can achieve the object of the present invention. When a bar code is used, said bar code may be a one-dimensional code or a two-dimensional code, when the cell phone (4) receives the payment code, it converts the payment code into a bar code and displays it on the screen of the cell phone (4). The POS machine (3) has a bar code reading device which is used to identify said bar code and to decodes said bar code into the payment code to carry out the subsequent payment steps. When the NFC technique is adopted, said cell phone (4) communicates with the POS machine (3) by means of the NFC technique, said cell phone (4) includes an NFC element by which the payment code is transmitted to the POS machine (3); said POS machine (3) includes an NFC element for communication with the cell phone (4), by which the payment code sent from the cell phone (4) is received, then the POS machine (3) uses said payment code to perform the subsequent payment steps. In addition, it is also possible to use ultrasonic technique for the communication between both parties. If the POS machine (3) is further equipped with an ultrasonic receiver device, the cell phone (4) and the POS machine (3) communicate to each other with use of ultrasonic. The cell phone (4) transmits via its speaker an ultrasonic carrying payment code information to the POS machine (3), and the POS machine (3) decodes and thus recovers the payment code after receiving the ultrasonic via its ultrasonic receiver device. Then the POS machine (3) uses the payment code for the subsequent payment step(s).

Figure 3:
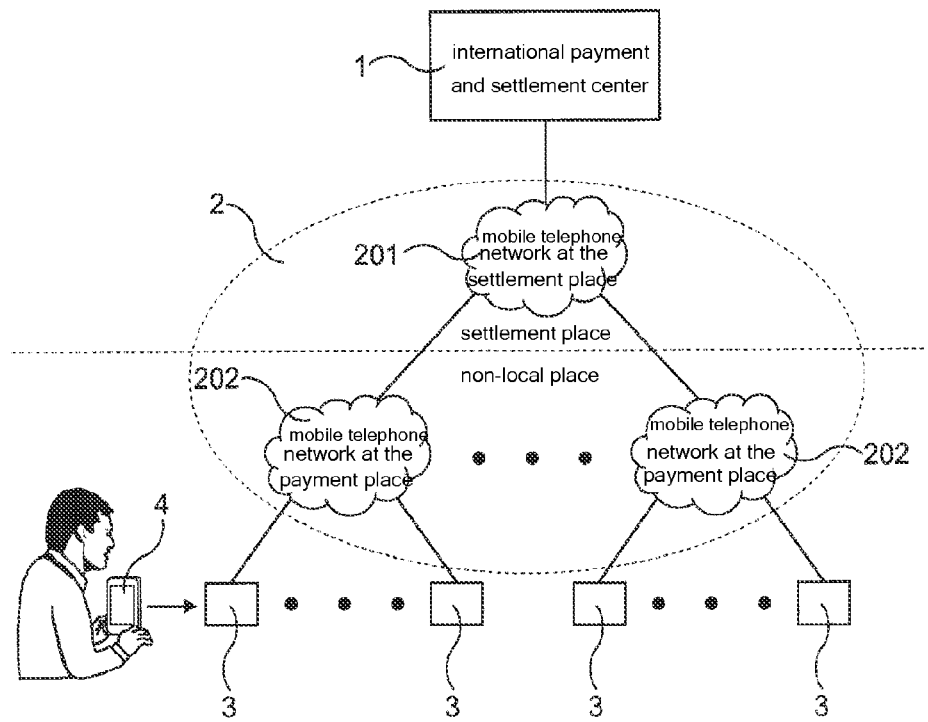
FIG. 3 is a schematic drawing of the structure of a payment system according to the second embodiment of the present invention.

Referring to FIG. 3, which is a schematic drawing of the structure of a payment system according to the second embodiment of the present invention, and which shows that compared to the first embodiment, the second embodiment is mainly different in that a non-local merchant is added, namely, the user makes a payment in a place other than the settlement place. Since most mobile telephone networks support a roaming networking, by means of this payment system, the payment service can be extended to anywhere in the world that has a mobile telephone network. Referring still to FIG. 3, the mobile telephone network (2) comprises a mobile telephone network (201) at the settlement place and a mobile telephone network (202) at the payment place, wherein the mobile telephone network (201) at the settlement place and the mobile telephone network (202) at the payment place are in a roaming interconnection, the mobile telephone network (202) at the payment place is in communication connection to the POS machine (3), and the mobile telephone network (201) at the settlement place is in communication connection to the international payment and settlement center (1); when the user makes a payment on the POS machine (3) of the merchant, the international payment and settlement center (1) generates an one-off payment code according to the amount of payment to be transmitted to the user's cell phone (4), then the user's cell phone (4) sends said payment code to the merchant's POS machine (3) which sends the transaction message including the amount of payment and said payment code to the international payment and settlement center (1) over the mobile telephone network (202) at the payment place and the mobile telephone network (201) at the settlement place to request authorization to said transaction, the international payment and settlement center (1) authorizes said transaction after verifying said payment code and the amount of payment, and then returns the result of authorization to the POS machine (3) over the mobile telephone network (201) at the settlement place and the mobile telephone network (202) at the payment place, and the international payment and settlement center (1), after authorizing said transaction, collects the money of said transaction from the payment account of the user, and pays the money that should be charged by the merchant to the receipts account of the merchant after deducting the commission and handling charges.

In the second embodiment, the merchant's POS machine (3) belongs to the mobile telephone network (202) at the payment place, i.e. the local mobile telephone network, the merchant needs to have a mobile telephone account in said mobile telephone network (202) at the payment place, so that the POS machine (3) can access the mobile telephone network (202) at the payment place so as to be connected to the international payment and settlement center (1); as for the transaction performed by the user on said merchant's POS machine (3) using the cell phone (4), during settlement, the international payment and settlement center (1) collects the money from the payment account of the user in the international payment and settlement center (1) according to the transaction, and then transfers the money to the receipts account of the merchant after deducting the commission and handling charges, and then the mobile telephone network (202) at the payment place pays said money into the bank account of the merchant after deducting the commission and handling charges.

Figure 4:
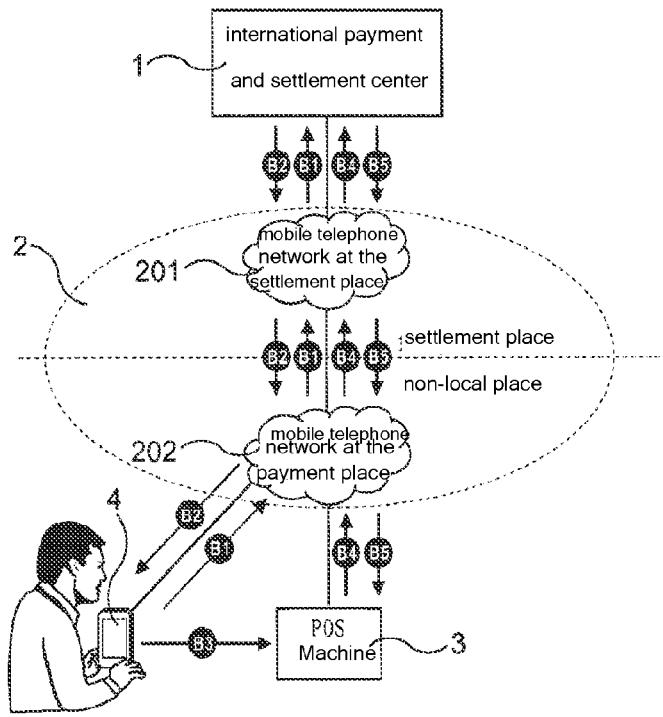
FIG. 4 is a schematic drawing of the steps of a payment system according to the second embodiment of the present invention.

Referring to FIG. 4, which is a schematic drawing of the steps of a payment system according to the second embodiment of the present invention. The method shown in FIG. 4 further comprises the following group of steps B, which are steps of the user making a payment on a POS machine (3) of a non-local merchant. Specifically, said group of steps B includes:

B1: before making a payment, the user sending a transaction request message to the international payment and settlement center (1) over the mobile telephone network (202) at the payment place and the mobile telephone network (201) at the settlement place using the cell phone (4), said transaction request message including the upper limit of the amount of payment and the password;

B2: the international payment and settlement center (1) generating an one-off unique payment code according to the amount of payment after verifying the correctness of the transaction request message and returning it to the user's cell phone (4) over the mobile telephone network (201) at the settlement place and the mobile telephone network (202) at the payment place;

B3: the user's cell phone (4) transmitting the said payment code to the merchant's POS machine (3);

B4: the POS machine (3) generating a transaction message according to the payment code and the amount of payment, and transmitting said transaction message to the international payment and settlement center (1) over the mobile telephone network (202) at the payment place and the mobile telephone network (201) at the settlement place;

B5: the international payment and settlement center (1) authorizing said transaction after verifying the correctness of the payment code and the amount of payment included in the transaction message, and then returning the result of authorization to the POS machine (3) over the mobile telephone network (201) at the settlement place and the mobile telephone network (202) at the payment place;

the international payment and settlement center (1) collecting the money for said transaction from the payment account of the user after authorizing said transaction and paying the money that should be charged by the merchant in said transaction to the receipts account of the merchant after deducting the commission and handling charges.

The further improvement of the present invention is increasing the step of the POS machine (3) of the merchant transmitting the amount of payment to the user's cell phone (4), which could avoid the user entering a wrong upper limit of the amount of payment, the detailed steps include before the user sending a transaction request message to the international payment and settlement center (1), the merchant entering the amount of payment on the POS machine (3) and transmitting it to the user's cell phone (4) by any one mean of bar code, NFC and ultrasonic waves and so on as said above, and, the upper limit of the said amount of payment is equal to this amount of payment. In addition, it could also be realized by the merchant tells the user the related amount of payment and the user entering the said limit of the said amount of payment to the user's cell phone (4) by himself.

In the present invention, the payment code is set to be used only for one payment operation within a predetermined period of validity, and after the period of validity or after the payment code has been used once for a payment operation, the international payment and settlement center (1) will immediately invalidate said payment code so that it cannot be used anymore. Said predetermined period of validity is a specified period of time starting from the international payment and settlement center (1) generating said payment code, for example, if the specified period of time is five minutes, then the user can only make one payment operation that does not exceed the amount of payment using said payment code within five minutes.

The features of the present invention has been described above in detail, although the present invention is described using the above-mentioned embodiments, the present invention is not limited to them, and various changes and variations can be made without departing from the spirit of the present invention and the scope of the appended claims.

By means of the payment system and method using a mobile telephone network for charging and settlement according to the present invention, the user can obtain a payment code by sending a transaction request message to the international payment and settlement center (1) using his cell phone (4) before the payment, and then the user can make the payment with said payment code on a POS machine (3) at anywhere of the world within a predetermined period of validity, the process of payment is just as fast and convenient as using a credit card to pay one a POS machine. The implementation of the present invention will bring about good social benefit and economic benefit and help to popularize electronic payment, and the present invention can replace credit cards to become the most universal payment means.

What is claimed is:

1. A payment system using a mobile telephone network for charging and settlement, wherein said payment system comprises an international payment and settlement center, a mobile telephone network, a merchant's Point-of-Sale machine, a user's cell phone, wherein the international payment and settlement center is in communication connection to the mobile telephone network, and the international payment and settlement center includes the payment account of each user and the receipts account of each merchant, the user's cell phone is associated with the user's payment account, and the user's cell phone accesses the mobile telephone network, the merchant's Point-of-Sale machine is associated with the receipts account of the merchant, the merchant's Point-of-Sale machine accesses the mobile telephone network; when the user makes a payment on the merchant's Point-of-Sale machine, the international payment and settlement center generates an one-off payment code according to the amount of payment, which is transmitted to the user's cell phone over the mobile telephone network, and the user's cell phone transmits said payment code to the merchant's Point-of-Sale machine, then the Point-of-Sale machine sends a transaction message including the amount of payment and said payment code to the international payment and settlement center over the mobile telephone network to request authorization to said transaction, and the international payment and settlement center authorizes said transaction after checking the correctness of said payment code and amount of payment, and then returns the result of authorization to the Point-of-Sale machine, and the international payment and settlement center, after authorizing said transaction, collects the money of said transaction from the payment account of the user, and pays the money that should be charged by the merchant to the receipts account of the merchant after deducting the commission and handling charges.

2. The payment system using a mobile telephone network for charging and settlement according to claim 1, wherein the mobile telephone network comprises a mobile telephone network at the settlement place and a mobile telephone network at the payment place, wherein the mobile telephone network at the settlement place and the mobile telephone network at the payment place are in a roaming interconnection, the mobile telephone network at the payment place is in communication connection to the Point-of-Sale machine, and the mobile telephone network at the settlement place is in communication connection to the international payment and settlement center; when the user makes a payment on the Point-of-Sale machine of the merchant, the international payment and settlement center generates an one-off payment code according to the amount of payment to be transmitted to the user's cell phone, then the user's cell phone sends said payment code to the merchant's Point-of-Sale machine which sends the transaction message including the amount of payment and said payment code to the international payment and settlement center over the mobile telephone network at the payment place and the mobile telephone network at the settlement place to request authorization to said transaction, the international payment and settlement center authorizes said transaction after verifying said payment code and the amount of payment, and then returns the result of authorization to the Point-of-Sale machine over the mobile telephone network at the settlement place and the mobile telephone network at the payment place, and the international payment and settlement center, after authorizing said transaction, collects the money of said transaction from the payment account of the user, and pays the money that should be charged by the merchant to the receipts account of the merchant after deducting the commission and handling charges.

3. The payment system using a mobile telephone network for charging and settlement according to claim 1, wherein communication between the said cell phone and the Point-of-Sale machine is realized by bar code, upon receiving the payment code, the cell phone converts said payment code into a bar code and displays it on the screen of the cell phone, and that the Point-of-Sale machine identifies said bar code and decodes it into the payment code to proceed with the subsequent payment steps.

4. The payment system using a mobile telephone network for charging and settlement according to claim 1, wherein the cell phone communicates with the Point-of-Sale machine by means of an NFC technique, said cell phone comprises an NFC element by which the payment code is transmitted to the Point-of-Sale machine; said Point-of-Sale machine includes an NFC element for communication with the cell phone, by which the payment code sent from the cell phone is received, then the Point-of-Sale machine uses said payment code to perform the subsequent payment steps.

5. The payment system using a mobile telephone network for charging and settlement according to claim 1, wherein the Point-of-Sale machine is further equipped with an ultrasonic receiver device; the cell phone and the Point-of-Sale machine communicate to each other with use of ultrasonic, wherein the cell phone transmits via its speaker the ultrasonic carrying payment code information to the Point-of-Sale machine, and the Point-of-Sale machine decodes and thus recovers the payment code after receiving the ultrasonic via its ultrasonic receiver device, then the Point-of-Sale machine uses the payment code for the subsequent payment step.

6. A payment method using a mobile telephone network for charging and settlement, wherein said method comprises providing an international payment and settlement center that includes the payment account of each user and the receipts account of each merchant, the user's cell phone is associated with the user's payment account, and the user's cell phone accesses the mobile telephone network, the merchant's Point-of-Sale machine is associated with the receipts account of the merchant, the merchant's Point-of-Sale machine accesses the mobile telephone network; when the user makes a payment on the merchant's Point-of-Sale machine, the international payment and settlement center generates an one-off payment code according to the amount of payment, which is transmitted to the user's cell phone over the mobile telephone network, and the user's cell phone transmits said payment code to the merchant's Point-of-Sale machine, then the Point-of-Sale machine sends a transaction message including the amount of payment and said payment code to the international payment and settlement center over the mobile telephone network to request authorization to said transaction, and the international payment and settlement center authorizes said transaction after checking the correctness of said payment code and amount of payment, and then returns the result of authorization to the Point-of-Sale machine, and the international payment and settlement center, after authorizing said transaction, collects the money of said transaction from the payment account of the user, and pays the money that should be charged by the merchant to the receipts account of the merchant after deducting the commission and handling fees.

7. The payment method using a mobile telephone network for charging and settlement according to claim 6, wherein communication between the said cell phone and the Point-of-Sale machine is realized by bar code, upon receiving the payment code, the cell phone converts said payment code into a bar code and displays it on the screen of the cell phone, and that the Point-of-Sale machine identifies said bar code and decodes it into the payment code to proceed with the subsequent payment steps.

8. The payment method using a mobile telephone network for charging and settlement according to claim 6, wherein the cell phone communicates with the Point-of-Sale machine by means of an NFC technique, said cell phone transmits the payment code to the Point-of-Sale machine by using its NFC element, and said Point-of-Sale machine receives the payment code sent from the cell phone by using its NFC element, then the Point-of-Sale machine uses said payment code to perform the subsequent payment steps.

9. The payment method using a mobile telephone network for charging and settlement according to claim 6, wherein said method further comprises the following group of steps A, which are steps of the user making a payment on the Point-of-Sale machine of the merchant using the cell phone and which specifically includes:

A1: before making a payment, the user sending a transaction request message to the international payment and settlement center over the mobile telephone network using the cell phone, said transaction request message including the upper limit of the amount of payment and the password;

A2: the international payment and settlement center generating an one-off unique payment code according to the amount of payment after verifying the correctness of the transaction request message and returning it to the user's cell phone;

A3: the user's cell phone transmitting the said payment code to the merchant's Point-of-Sale machine;

A4: the Point-of-Sale machine generating a transaction message according to the payment code and the amount of payment, and transmitting said transaction message to the international payment and settlement center over the mobile telephone network;

A5: the international payment and settlement center authorizing said transaction after verifying the correctness of the payment code and the amount of payment included in the transaction message, and then returning the result of authorization to the Point-of-Sale machine;

the international payment and settlement center collecting the money for said transaction from the payment account of the user after authorizing said transaction and paying the money that should be charged by the merchant in said transaction to the receipts account of the merchant.

10. The payment method using a mobile telephone network for charging and settlement according to claim 6, wherein said method further comprises the following group of steps B, which are steps of the user making a payment on a Point-of-Sale machine of a non-local merchant, and which specifically includes:

B1: before making a payment, the user sending a transaction request message to the international payment and settlement center over the mobile telephone network at the payment place and the mobile telephone network at the settlement place using the cell phone, said transaction request message including the upper limit of the amount of payment and the password;

B2: the international payment and settlement center generating an one-off unique payment code according to the amount of payment after verifying the correctness of the transaction request message and returning it to the user's cell phone over the mobile telephone network at the settlement place and the mobile telephone network at the payment place;

B3: the user's cell phone transmitting the said payment code to the merchant's Point-of-Sale machine;

B4: the POS machine generating a transaction message according to the payment code and the amount of payment, and transmitting said transaction message to the international payment and settlement center over the mobile telephone network at the payment place and the mobile telephone network at the settlement place;

B5: the international payment and settlement center authorizing said transaction after verifying the correctness of the payment code and the amount of payment included in the transaction message, and then returning the result of authorization to the Point-of-Sale machine over the mobile telephone network at the settlement place and the mobile telephone network at the payment place;

the international payment and settlement center collecting the money for said transaction from the payment account of the user after authorizing said transaction and paying the money that should be charged by the merchant in said transaction to the receipts account of the merchant.

11. The payment method using a mobile telephone network for charging and settlement according to claim 10, wherein said method comprises the steps of the Point-of-Sale machine of the merchant transmitting the amount of payment to the user's cell phone, which includes before the user sending a transaction request message to the international payment and settlement center, the merchant entering the amount of payment on the Point-of-Sale machine and transmitting it to the user's cell phone, and, the upper limit of the said amount of payment is equal to this amount of payment.

12. The payment method using a mobile telephone network for charging and settlement according to claim 6, wherein the payment code is set to be used only for one payment operation within a predetermined period of validity, and after the period of validity or after the payment code has been used once for a payment operation, the international payment and settlement center will immediately invalidate said payment code so that it cannot be used anymore.

* * * * *